3,356,622
POLYURETHANE FOAM PRODUCED FROM HYDROXYALKYLATED SUBSTANTIALLY PETROLEUM HYDROCARBON-INSOLUBLE PINE WOOD RESIN
David W. Delmonte, Wilmington, Del., assignor to Hercules Incorporated, a corporation of Delaware
No Drawing. Filed Dec. 31, 1963, Ser. No. 334,922
7 Claims. (Cl. 260—2.5)

This application is a continuation-in-part of copending application Ser. No. 229,999, filed Oct. 11, 1962, now abandoned.

This invention relates to rigid polyurethane foams and to methods for preparing same.

It is known that rigid polyurethane foams can be made from polyols, polyisocyanate, catalyst, blowing agent (water or low-boiling organic liquid), and surfactant. Commercially, these foams are ususally made by the "quasi-prepolymer" process, otherwise known as the "partial prepolymer" or "semiprepolymer" process. In the "quasi-prepolymer" process, part of the polyol and all the polyisocyanate are reacted to give a storage-stable polyisocyanate that probably also contains some monomeric diisocyanate. This liquid is called a quasi-prepolymer. At the time of foaming, the quasi-prepolymer is mixed with the remainder of the polyol, the blowing agent, catalyst(s) and surfactant. It is also advantageous, where reactants permit, to use the "one-shot" process wherein all reagents are combined quickly and foamed at once.

The above-described rigid polyurethane foams have desirable physical properties which adapt them for use for thermal insulation, buoyancy, sound and shock absorption, and comfort applications, particularly in the construction field.

In order to produce a satisfactory polyurethane foam, the reaction for producing the polyurethane must take place during the foaming stage so that thin walled cells of the polyurethane are formed. Closed cells are preferred in the foaming process and closed cells require certain characteristics in the polyurethane as it is forming such that the polyurethane passes through a stretched stage prior to attaining a cross-linked stage. The final foam is thus a cellular product in which the walls of the cells are formed of cross-linked polymer. Since the initially formed polymer must be elastic and must be cross-linked during foaming so as to gradually become rigid, special chemical reactivity is required in the reagents used. Moreover, the reagents must be capable not only of forming a polyurethane, but also of cross-linking as a final step in the process. In copending application Ser. No. 229,999, filed Oct. 11, 1962, is described rigid polyurethane foam in which substantially petroleum hydrocarbon-insoluble pine wood resin is used as a reactive filler component. This pine wood resin is, in part, phenolic and, in addition, contains carboxylic acid groups and thus acts as a carbon dioxide gas liberating agent, in which capacity it is not entirely adequate for the needs of the foaming process. However, it has otherwise made possible the production of rigid polyurethane foams which are economical for volume production, particularly in the construction industry.

In the process of polyurethane formation, this pine wood resin is used in combination with polyols which react with polyisocyanates to form the polyurethane, and the substantially petroleum hydrocarbon-insoluble pine wood resin, having largely acid functional groups, reacts with the polyisocyanate to form amide linkages to a greater extent than urethane linkages such as result from alcohols. Moreover, the petroleum hydrocarbon-insoluble pine wood resin is difficult to mix rapidly with the polyols due to its insolubility and relatively high softening point. Due to the mixing problem, some resin may remain unreacted and both the brittle nature of the unreacted resin and the different nature of the polymer containing reacted material contribute to a more friable rigid foam than is often desired.

It is an object of the present invention to produce polyurethane foams while retaining all of the advantages of the substantially hydrocarbon-insoluble pine wood resin, particularly in the case of the use or larger amounts thereof. It is a further object to produce a polyurethane foam having low friability, and a low $k$-factor as an insulator. It is a still further object to provide a mix of reduced viscosity that can produce a foam by the well known "one-shot" process, as well as by the prepolymer processes. Other objects will be apparent hereinafter.

In accordance with the present invention, it has now been found that hydroxyalkylated petroleum hydrocarbon-insoluble pine wood resin in admixture with a polyol reacts with an organic polyisocyanate in the presence of a foaming agent to produce a polyurethane foam having the advantages attributable to hydroxyalkylated petroleum hydrocarbon-insoluble pine wood resin and improved properties over those of foams containing the pine wood resin itself.

The polyurethane foam produced in accordance with this invention is a copolymeric urethane of both the hydroxyalkylated petroleum hydrocarbon-insoluble pine wood resin and the polyol.

The hydroxyalkylated petroleum hydrocarbon-insoluble pine wood resin is an alcohol in which the alcohol groups are hydroxyethyl or hydroxypropyl groups such as are introduced by reaction of a petroleum hydrocarbon-insoluble pine wood resin and ethylene oxide or propylene oxide. Chemically, the hydroxyalkylated petroleum hydrocarbon-insoluble pine wood resin is a monoester of ethylene glycol or propylene glycol, since the first alkylene oxide to react forms an alkylene glycol monoester from the carboxyl group of the pine wood resin. This is the simplest hydroxyalkylated petroleum hydrocarbon-insoluble pine wood resin of this invention and it has substantially the same chemical composition as it would have if produced by esterification of the petroleum hydrocarbon-insoluble pine wood resin with ethylene glycol or propylene glycol instead of with the corresponding alkylene oxide. Further reaction of alkylene oxide with the ester initially produced, either by esterification with the alkylene glycol or by reaction with alkylene oxide, produces the hydroxyalkyl ether of the phenolic group of the petroleum hydrocarbon-insoluble pine wood resin. Still further reaction of the initially produced alkylene glycol monoester produces a product in which the carboxyl groups are esterified with the alkylene glycol and both the phenol groups and alcohol groups are etherified by hydroxyalkyl groups. The monoester of the petroleum hydrocarbon-insoluble pine wood resin and ethylene or propylene glycol will have an acid number of 0–19. The lower acid number is usually produced by the reaction with the alkylene oxide and either the petroleum hydrocarbon-insoluble pine wood resin or the ester of the petroleum hydrocarbon-insoluble pine wood resin with the alkylene oxide.

The pine wood resin used in accordance with the present invention may be defined as the substantially petroleum hydrocarbon-insoluble pine wood resin prepared, for example, in accordance with the processes of U.S. patents to Hall, Nos. 2,193,026 and 2,221,540, or equivalent processes which separate the petroleum hydrocarbon-insoluble pine wood resin from the rosin. This material, which is characterized herein by the term "substantially petroleum hydrocarbon-insoluble pine wood resin," is the resinous material which can be prepared from pine wood as follows: The pine wood, which may or may not have been steamed to remove volatile constituents such as turpentine and pine oil, may be extracted with a coal tar hydrocarbon such as benzol or toluol, or other suitable extraction solvent, and the extract then freed of volatile constituents, leaving a residue consisting of a mixture of wood rosin and the resin used in the present composition. Extraction of this mixture with a petroleum hydrocarbon such as, for example, gasoline, dissolves and removes the rosin. After separation of the rosin, high in abietic acid, a resinous residue remains which is low in abietic acid. Alternatively, the material obtained on evaporation of the coal tar hydrocarbon extract may be dissolved in a mixture of furfural and a petroleum hydrocarbon such as gasoline, and the two layers which form separated, in which case the substantially petroleum hydrocarbon-insoluble resin is found dissolved in the furfural phase from which it may be obtained by evaporation of the furfural. Other methods of isolating the desired petroleum hydrocarbon-insoluble pine wood resin may be employed, if desired. This resin, used in accordance with the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha- and toluol-insoluble material, depending upon the details of the extraction processes utilized. This resin will meet or nearly meet the following specifications, namely, substantial insolubility in petroleum hydrocarbons, substantially complete solubility in alcohol, a methoxy content from about 3% to about 7.5% (usually from about 4% to about 6%), an acid number in the range from about 90 to about 110, and a drop melting point in the range from about 95° C. to about 125° C. (203° F. to 257° F.). This resin is a solid material and comes into commerce in the pulverized or ground form. This resin is of a phenolic character and, for the purposes of this invention, its molecular weight is 450.

The production of a hydroxyalkylated petroleum hydrocarbon-insoluble pine wood resin by esterification with ethylene glycol or propylene glycol is disclosed in U.S. 2,138,193. This ester or the ester produced by reaction with an alkylene oxide or the alkylene oxide reaction product of this ester wherein the phenolic hydroxyl groups of the ester are also hydroxyalkylated is satisfactory for use in the present invention. The ethylene oxide reaction product of petroleum hydrocarbon-insoluble pine wood resin of U.S. 2,555,901, wherein 12–60% ethylene oxide is reacted, is a hydroxyalkylated petroleum hydrocarbon-insoluble pine wood resin suitabzle for use in this invention. However, the broader range of 7–40% reacted ethylene oxide, based on the weight of petroleum hydrocarbon-insoluble pine wood resin, is useful in the present invention. Moreover, the propylene oxide reaction product of petroleum hydrocarbon-insoluble pine wood resin is also useful and in some respects is superior. Suitable preparations are exemplified in Table 1.

The amount of alkylene oxide reacted with the petroleum hydrocarbon-insoluble pine wood resin will be in general in the range of about 7 to 40 percent by weight of the pine wood resin. The minimum will be the amount of alkylene oxide necessary to react with all of the carboxyl groups to produce the monoester of the glycol corresponding to the alkylene oxide used. Similarly, the product of reaction of the substantially hydrocarbon-insoluble pine wood resin with ethylene glycol or propylene glycol will be the monoester of the glycol and will preferably be substantially free of carboxylic acid groups.

The hydroxyalkylated petroleum hydrocarbon-insoluble pine wood resin particularly useful in this invention for rigid foams is one in which at least the carboxyl groups of the pine wood resin are reacted with an alkylene oxide molecule whereby such group as is reacted is converted into a hydroxyalkylated carboxyl group. Further reaction with alkylene oxide converts the phenol groups into hydroxyalkoxy groups and then the alcohol groups into hydroxyalkoxy groups which groups are hydroxyalkylether groups. Further reaction of hydroxyalkyl groups with alkylene oxide produces a hydroxyalkoxyalkylated petroleum hydrocarbon-insoluble pine wood resin which is more desirable for flexible foams. For rigid foams, the petroleum hydrocarbon-insoluble pine wood resin is, therefore, preferably reacted with not more than one mole weight of alkylene oxide for each OH group (phenolic, alcoholic or carboxylic) so as to effect hydroxyalkylation without production of hydroxyalkoxyalkylated compounds such as are obtained from reaction of excess alkylene oxides with the hydroxyalkyl initially introduced. For flexible foams, up to 40% alkylene oxide reacts to form polyether alcohols of the initial hydroxyalkylated pine wood resin, which are also referred to herein as hydroxyalkylated petroleum hydrocarbon-insoluble pine wood resins.

The hydroxypropylated petroleum hydrocarbon-insoluble pine wood resin produced from petroleum hydrocarbon-insoluble pine wood resin and propylene oxide is preferred in the present invention because it has little or no polyether linkages, i.e., only one propylene oxide appears to react with each carboxyl, phenolic hydroxyl, and alcoholic hydroxyl under mild conditions so that the hydroxypropylation is readily stopped before polyether formation begins. This is advantageous since the polyalkylene ether unit further increases the requirement for high hydroxyl number in the polyol added in order to produce a satisfactory foam.

The hydroxyalkylated petroleum hydrocarbon-insoluble pine wood resin is used in admixture with a polyol in the reaction with a polyisocyanate to produce the polyurethane. The polyols which are so used are polyether alcohols and/or polyester alcohols. The former are hydroxyalkoxy alcohols such as alkylene oxide reaction products of a compound having an active hydrogen. In this group are the polyols or mixtures of polyols known to be useful for the preparation of rigid polyurethane foams and having hydroxyl numbers of at least about 525. Thus, there can be used (1) polyols of the polyether class such as addition products of polyhydric alcohols and alkylene oxides, e.g., polyols obtained by the reaction of propylene oxide with sorbitol, mannitol, glycerol, glucose, sucrose, pentaerythritol, trimethylolpropane, trimethylolbutane, methyl-α-D-glucoside, 1,2,6-hexanetriol, 1,2,4-butanetriol and the like, in mole ratios of the former to the latter from about 3:1 to about 15:1; (2) polyols of the polyester class such as formed from polyhydric alcohols and dicarboxylic acid, e.g., mixed polyester of ethylene glycol, and glycerol, in which glycol is in excess so as to have alcohol terminal groups; (3) diethylene glycol, hexylene glycol, dipropylene glycol; and (4) polyols of the polyether class which are alkylene oxide reaction products of amines such as ammonia, ethylene diamine, toluene diamine, and triethylene diamine, particularly wherein the alkylene oxide is propylene oxide.

The polyols used in the polyurethane formation will have a hydroxyl number in the range of about 40 to about 650, depending on rigidity desired in the foam. A hydroxyl number of 40–75 is preferred for a flexible foam, a hydroxyl number of 150–250 is preferred for a semi-rigid foam, and a hydroxyl number of 400–650 is preferred for a rigid foam. The compressive strengths for flexible foam is less than about 1 p.s.i. (2 lb./cu. ft. density) for semi-rigid foam, 5–30 p.s.i. (2 lb./cu. ft. density), and for rigid foam 20–40 p.s.i. (2 lb./cu. ft. density). The hydroxyl number is the number of mg. KOH required to neutralize the acid required to esterify 1 gram of sample.

The preferred polyether alcohols used with the hydroxyalkylated petroleum hydrocarbon-insoluble pine wood resin in this invention are: sorbitol-propylene oxide adduct (1:10), pentaerythritol-propylene oxide adduct (1:4.5) and sucrose-propylene oxide adduct (1:14).

The alkylene oxide reaction with petroleum hydrocarbon-insoluble pine wood resin is carried out separately from or together with the alkylene oxide reaction which produces the polyol. When made together, the petroleum hydrocarbon-insoluble pine wood resin and a suitable polyol, or partial reaction product thereof with an alkylene oxide, are mixed and the mixture is reacted with the alkylene oxide in the manner outlined above for the procedure for reacting the petroleum hydrocarbon-insoluble pine wood resin alone with the alkylene oxide.

The ratio of hydroxyalkylated petroleum hydrocarbon-insoluble pine wood resin to polyol used in this invention will be determined by the equivalent weight. The equivalent weight needed to get a good rigid polyurethane foam is about 100 to 180 average for the total alcohol mixture (combined polyol and hydroxyalkylated petroleum hydrocarbon-insoluble pine wood resin) used. The equivalent weight of the alcohol mixture is determined by the equation:

$$\text{Equivalent weight} = \frac{56{,}100}{\text{Hydroxyl No.} + \text{Acid No.}}$$

Since the hydroxyl number of the hydroxyalkylated petroleum hydrocarbon-insoluble pine wood resin is about 200–270 and the acid number is 0 to 19, a polyol with a high hydroxyl number is needed to reach the desired equivalent weight. In the case of a mixture of hydroxyalkylated petroleum hydrocarbon-insoluble pine wood resin and polyol, the equivalent weight is determined from the hydroxyl number and acid number of the mixture.

The polyisocyanates that may be used are any organic polyisocyanate such as aliphatic, aromatic (arylene) or cycloaliphatic organic polyisocyanate or mixture thereof, such as the isomeric mixtures normally resulting from their production, and especially the hydrocarbon and halohydrocarbon polyisocyanates including ethylene diisocyanate, trimethylene diisocyanate, tetramethylene diisocyanate, hexamethylene diisocyanate, decamethylene diisocyanate, p-phenylene diisocyante, m-phenylene diisocyanate, naphthalene diisocyanate, benzene-1,3,5-triisocyanate, tolylene diisocyanate, tolylene-2,4,6-triisocyanate, ethylbenzene-2,4,6-triisocyanate, monochlorobenzene-2,4,6-triisocyanate, triphenylmethane-4,4',4''-triisocyanate, diphenyl-2,4,4'-triisocyanate, tolylene-2,4-diisocyanate, tolylene-2,6-diisocyanate, diphenylmethane-4,4'-diisocyanate, 3,3'-dimethyl diisocyanatobiphenyl, 3,3'-dimethoxy-4,4'-diisocyanatobiphenyl, 2,3,5,6-tetramethyl-p-phenylene diisocyanate, o-, m-, and p-xylene diisocyanates, 4,4'-diphenylene diisocyanate, p,p'-bibenzyl diisocyanate, 4,4'-methylene bis(o-tolyl diisocyanate), 1,5-naphthyl diisocyanate, polymethylene polyphenylisocyanate, and the like (see Siefken-Annalen 562, pp. 127–135 (1949)). The polyisocyanates have various reactivities, some being much slower than others. The amount of diisocyanate used is an amount such that the number of free reactive isocyanato groups is substantially equal to the number of hydroxyl groups in the alcohol mixture of polyol and hydroxyalkylated petroleum hydrocarbon-insoluble pine wood resin. In general, the amount is such that about 0.7 to 1.1 isocyanato groups are available per reactive hydrogen in said polyol mixture.

The foaming agent that is used in the process of this invention may be any carbon dioxide generating reagent, including water, which on reaction with the isocyanate produces carbon dioxide, or any nitrogen producing reagent which produces nitrogen at the temperature of curing the polyurethane, or any organic solvent which is volatile at the curing temperature. The foaming agents that are particularly desirable are low-boiling organic solvents which become gaseous at the curing temperature, and these include trichloromonofluoromethane, dichlorodifluoromethane, dichlorofluoromethane, trifluorotrichloroethane, 1,1-dichloro-1-fluoromethane, 1-chloro-1,1-difluoro-2,2-dichloroethane, 1,1,1-trifluoro-2-chloro-2-fluoro-3,3-difluoro-4,4,4-trifluorobutane, tetrafluorodichloroethane, difluorotetrachloroethane, as well as the chlorinated hydrocarbons such as methylene chloride, chloroform and carbon tetrachloride.

The foaming composition may also include a surfactant such as a silicone.

The process of this invention may be carried out by the "one-shot" process, or by the "quasi-prepolymer" process. In the former, the reagents, including the blowing agent, are mixed in the desired ratio and then foamed. In the latter, a partial reaction is effected between part of the reagents and this is called a quasi-prepolymer. The quasi-propolymer is usually prepared from all of the polyisocyanate and part of the alcohol mixture of hydroxyalkylated petroleum hydrocarbon-insolube pine wood resin and polyol. The quasi-prepolymer is then mixed with the remaining alcohol mixture and foaming agent and catalyst and surfactant, when used, and foamed in a suitable mold or shaped container. The cross-linking need not be completed at once, but may be continued while the foam is in the expanded state. By this process, rigid, semi-rigid or flexible foams may be produced, depending on the reagents used. Flexible foams are produced from alcohol mixtures of hydroxyl numbers in the range of about 40–75; semi-rigid foams are produced from alcohol mixtures of hydroxyl numbers in the range of about 150–250; and rigid foams are produced from alcohol mixtures of hydroxyl numbers in the range of about 300–650. Flexible foams have a compressive strength of less than about 1 p.s.i. at 2 lb./cu. ft. density; semi-rigid foams have a compressive strength of about 5–30 p.s.i. at 2 lb./cu. ft. density; and rigid foams have a compressive strength of about 20–40 at 2 lb./cu. ft. density.

If desired, a catalyst can be used to accelerate the urethane formation. Suitable catalyst include tetramethylene diamine, trimethyl amine, n-methyl morpholine, n-ethyl morpholine, triethanol amine, tetramethylbutanediamine, triethylenediamine, triethyl amine, stannous octoate, dibutyltin dilaurate, and ferric acetyl acetonate. Other catalysts known in the polyurethane foam art may also be used.

The foaming process is carried out by heating at a temperature in the range of about 25° C. to about 100° C. to effect foaming and curing. The temperature of foaming is selected to suit the foaming agent used, as well as the reactivity of the reagents.

The process of the present invention is illustrated by the following examples, where parts and percentages are by weight.

*Example 1*

One hundred parts of a mixture of 40 parts hydroxyethylated petroleum hydrocarbon-insoluble pine wood resin EO–2 (see Table 1) and 60 parts hydroxypropylated sorbitol (10:1 propylene oxide:sorbitol) were mixed and blended with 32 parts trichlorofluoromethane, 1 part silicone fluid, 0.02 part stannous octoate and 1 part tetramethylbutanediamine. To this was quickly added 106.8 parts of crude methylene bis(4-phenyl isocyanate). The liquid mixture was immediately stirred 5 seconds at 2400 r.p.m. and then poured into a shaped container, where it expanded to a rigid foam. The foam density was 2.1 lb./cu. ft.; compressive strength (10% deflection) was 22 p.s.i.; tensile strength was 30 p.s.i.; k-factor was 0.134 (thermal conductivity).

*Example 2*

A quasi-prepolymer with a calculated NCO/OH of 4.50 was prepared by stirring 23.3 parts of a mixture containing 60 parts 4.5:1 propylene oxide:pentaerythritol adduct and 40 parts hydroxyethylated pine wood resin EO–21 (see Table 1) with 69.5 parts of tolylene diisocyanate (an 80:20 mixture of 2,4-:2,6-tolylene diisocyanate, called TDI) for 1 hour. When the quasi-prepolymer cooled to room temperature, it was added all at once to a mixture of 76.7 parts of the same 60/40 blend of 4.5:1 propylene oxide:pentaerythritol adduct/hydroxyethylated pine wood resin EO-21 mentioned above, 30 parts of trichlorofluoromethane, 1 part tetramethylbutanediamine, 0.1 part stannous octoate, and 1 part silicone fluid. The final mixture was immediately stirred for 5 seconds at 2400 r.p.m. on a laboratory stirrer and the liquid poured into a cardboard container where it expanded to a rigid foam. Foam density was 1.9 lb./cu. ft.; compressive strength (10% deflection) was 15 p.s.i.; tensile strength was 28 p.s.i.; k-factor was 0.120.

*Example 3*

A quasi-prepolymer with a calculated NCO/OH of 4.50 was prepared by stirring 23.4 parts of a mixture containing 60 parts 10:1 propylene oxide:sorbitol adduct and 40 parts of hydroxyethylated pine wood resin EO-49 (see Table 1) with 62.3 parts of tolylene diisocyanate for 1 hour. When the quasi-prepolymer cooled to room temperature, it was added all at once to a mixture of 76.6 parts of the same 60/40 blend of 10:1 propylene oxide:sorbitol adduct/hydroxyethylated pine wood resin EO-49 mentioned above, 30 parts trichlorofluoromethane, 0.8 part tetramethylbutanediamine, 0.1 part stannous octoate, and 1 part silicone fluid. The final mixture was immediately stirred for 5 seconds at 2400 r.p.m. on a laboratory stirrer and the liquid poured into a cardboard box where it expanded to a rigid foam. Foam density was 1.9 lb./cu. ft.; compressive strength (10% deflection) was 22 p.s.i.; tensile strength was 46 p.s.i.; k-factor was 0.123.

*Example 4*

A quasi-prepolymer with a calculated NCO/OH of 4.50 was prepared by stirring 23.3 parts of a mixture containing 50 parts 4.5:1 propylene oxide:pentaerythritol adduct and 50 parts hydroxyethylated pine wood resin EO-49 (see Table 1) with 65.7 parts of tolylene diisocyanate for 1 hour. When the quasi-prepolymer cooled to room temperature, it was added all at once to a mixture of 76.7 parts of the same 50/50 blend of 4.5:1 propylene oxide:pentaerythritol adduct/hydroxyethylated pine wood resin EO-49 mentioned above, 30 parts of trichlorofluoromethane, 0.8 part tetramethylbutanediamine, 0.1 part stannous octoate, and 1 part silicone fluid. The final mixture was immediately stirred for 5 seconds at 2400 r.p.m. on a laboratory stirrer and the liquid poured into a cardboard container, where it expanded to a rigid foam. Foam density was 1.9 lb./cu. ft.; compressive strength (10% deflection) was 25 p.s.i.; tensile strength was 50 p.s.i.; k-factor was 0.141.

*Example 5*

A quasi-prepolymer with a calculated NCO/OH of 4.50 was prepared by stirring 23.3 parts of a mixture containing 40 parts 4.5:1 propylene oxide:pentaerythritol adduct and 60 parts hydroxyethylated pine wood resin EO-21 (see Table 1) with 64.6 parts of tolylene diisocyanate for 1 hour. When the quasi-prepolymer cooled to room temperature, it was added all at once to a mixture of 76.7 parts of the same 40/60 blend of 4.5:1 propylene oxide:pentaerythritol adduct/hydroxyethylated pine wood resin EO-21 mentioned above, 30 parts of trichlorofluoromethane, 0.5 part tetramethylbutanediamine, 0.1 part stannous octoate, and 1 part silicone fluid. The final mixture was stirred immediately for 5 seconds at 2400 r.p.m. on a laboratory stirrer and the liquid poured into a cardboard container, where it expanded to a rigid foam. Foam density was 1.9 lb./cu. ft.; compressive strength (10% deflection) was 21 p.s.i.; tensile strength was 37 p.s.i.; k-factor was 0.117.

*Example 6*

A quasi-prepolymer with a calculated NCO/OH of 4.50 was prepared by stirring 23.3 parts of a mixture containing 60 parts 10:1 propylene oxide:sorbitol adduct and 40 parts hydroxypropylated pine wood resin PO-86 (see Table 1) with 60.6 parts of tolylene diisocyanate for 1 hour. When the quasi-prepolymer cooled to room temperature, it was added all at once to a mixture of 76.7 parts of the same 60/40 blend of 10:1 propylene oxide:sorbitol/hydroxypropylated pine wood resin PO-86 mentioned above, 30 parts of trichlorofluoromethane, 1 part tetramethylbutanediamine, 0.1 part stannous octoate, and 1 part silicone fluid. The final mixture was stirred immediately for 5 seconds at 2400 r.p.m. on a laboratory stirrer and the liquid poured into a cardboard container, where it expanded to a rigid foam. Foam density was 1.9 lb./cu. ft.; compressive strength (10% deflection) was 24 p.s.i.; tensile strength was 35 p.s.i.; k-factor was 0.150.

*Example 7*

A quasi-prepolymer with a calculated NCO/OH of 4.50 was prepared by stirring 23.4 parts of a mixture containing 40 parts 4.5:1 propylene oxide:pentaerythritol adduct and 60 parts hydroxypropylated pine wood resin PO-93 (see Table 1) with 65.5 parts of tolylene diisocyanate for 1 hour. When the quasi-prepolymer cooled to room temperature, it was added all at once to a mixture of 76.6 parts of the same 40/60 blend of 4.5:1 propylene oxide:pantaerythritol adduct/hydroxypropylated pine wood resin PO-93 mentioned above, 30 parts of trichlorofluoromethane, 1 part tetramethylbutanediamine, 0.1 part stannous octoate, and 1 part silicone fluid. The final mixture was immediately stirred for 5 seconds at 2400 r.p.m. on a laboratory stirrer and the liquid poured into a cardboard container, where it expanded to a rigid foam. Foam density was 1.8 lb./cu. ft.; compressive strength (10% deflection) was 16 p.s.i.; tensile strength was 21 p.s.i.; k-factor was 0.136.

*Example 8*

A quasi-prepolymer with a calculated NCO/OH of 4.50 was prepared by stirring 23.3 parts of a mixture containing 40 parts 4.5:1 propylene oxide:pentaerythritol adduct and 60 parts of hydroxypropylated pine wood resin PO-96 (see Table 1) with 63.3 parts of tolylene diisocyanate for 1 hour. When the quasi-prepolymer cooled to room temperature, it was added all at once to a mixture of 76.7 parts of the same 40/60 blend of 4.5:1 propylene oxide:pentaerythritol adduct/hydroxypropylated pine wood resin PO-96 mentioned above, 30 parts of trichlorofluoromethane, 1 part tetramethylbutanediamine, 0.1 part stannous octoate, and 1 part silicone fluid. The final mixture was immediately stirred for 5 seconds at 2400 r.p.m. on a laboratory stirrer and the liquid poured into a cardboard container, where it expanded to a rigid foam. Foam density was 1.8 lb./cu. ft.; compressive strength (10% deflection) was 16 p.s.i.; tensile strength was 36 p.s.i.; k-factor was 0.163.

*Example 9*

A quasi-prepolymer with a calculated NCO/OH of 4.50 was prepared by stirring 23.3 parts of a mixture containing 60 parts of polyester polyol which is the resinous mixed adipic ester of ethylene gylcol and glycerol and 40 parts of hydroxypropylated petroleum hydrocarbon-insoluble pine wood resin PO-93 (see Table 1) with 64.9 parts of tolylene diisocyanate for 1 hour. When the quasi-prepolymer cooled to room temperature, it was added all at once to a mixture of 76.7 parts of the same 60/40 blend of adipic glycol glycerol polyester polyol/hydroxypropylated petroleum hydrocarbon-insoluble pine wood resin PO-93 mentioned above, 30 parts of trichlorofluoromethane, 0.5 part tetramethylbutanediamine, 1 part silicone fluid. The final mixture was immediately stirred for 8 seconds at 2400 r.p.m. on a laboratory stirrer and the liquid poured into a cardboard container, where it expanded to a rigid foam. Foam density was 1.8 lb./cu. ft.; compressive strength (10% deflection) was 20 p.s.i.; tensile strength was 30 p.s.i.

*Example 10*

A quasi-prepolymer with a calculated NCO/OH of 4.50 was prepared by stirring 23.3 parts of a mixture containing 60 parts of polyester polyol which is the resinous adipic mixed ester of ethylene glycol and glycerol and 40 parts of hydroxyethylated petroleum hydrocarbon-insoluble pine wood resin EO-49 (see Table 1) with 63 parts of tolylene diisocyanate for 1 hour. When the quasi-prepolymer cooled to room temperature, it was added all at once to a mixture of 76.7 parts of the same 60/40 blend of adipic glycol glycerol polyester polyol/hydroxyethylated petroleum hydrocarbon-insoluble pine wood resin EO-49 mentioned above, 30 parts of trichlorofluoromethane, 0.2 part tetramethylbutanediamine, and 1 part silicone fluid. The final mixture was immediately stirred for 5 seconds at 2400 r.p.m. on a laboratory stirrer and the liquid poured into a cardboard container, where it expanded to a rigid foam. Foam density was 5 lbs./cu. ft.

substantially petroleum hydrocarbon-insoluble pine wood resin, the amount of the propylene oxide reacted being at least chemically equivalent to the carboxylic acid groups in the substantially petroleum hydrocarbon-insoluble pine wood resin.

5. A polyurethane foam prepared by reaction of an organic polyisocyanate with a mixture of (a) a polyol of the group consisting of polyesters and polyethers having at least two hydroxyl groups per molecule and (b) a hydroxyalkylated substantially petroleum hydrocarbon-insoluble pine wood resin in which the hydroxyalkyl group is selected from the group consisting of hydroxyethyl and hydroxypropyl in the presence of a foaming agent.

TABLE 1

| Preparation | Pine Wood Resin | Ethylene Oxide | Propylene Oxide | Reaction Product ||||
|---|---|---|---|---|---|---|---|
| | | | | Acid No. | Drop Softening Point | Hydroxyl (Acetyl), Percent | Water, Percent |
| EO-2[1] | 500 | 139 | | 1 | 80 | 8.2 | 0.27 |
| EO-21 | 500 | 194 | | 3 | 67 | 8.0 | 0.28 |
| EO-43 | 500 | 80 | | 19 | 91 | 8.0 | 0.12 |
| EO-49 | 500 | 163 | | 0 | 76 | 7.8 | 0.26 |
| EO-79 | 500 | 81 | | 17 | 89 | 7.3 | 0.20 |
| EO-94 | 500 | 139 | | 5 | 73 | 7.6 | 0.48 |
| PO-50 | 500 | | 75 | 0 | 87 | 6.9 | 0.23 |
| PO-53 | 500 | | 85 | 0 | 85 | 6.9 | 0.23 |
| PO-57 | 500 | | 60 | 0 | 91 | 6.2 | 0.26 |
| PO-86 | 500 | | 146 | 4 | 78 | 8.0 | 0.10 |
| PO-93 | 500 | | 176 | 5 | 68 | 8.2 | 0.20 |
| PO-96 | 500 | | 170 | 6 | 73 | 7.6 | 0.08 |

[1] 5 parts sodium methoxide added to pine wood resin as catalyst.

What I claim and desire to protect by Letters Patent is:

1. The method of preparing a polyurethane foam which comprises reacting at a temperature from about 25° C. to about 100° C. a mixture of (1) a blend of (a) a polyol of the group consisting of polyesters and polyethers having at least two hydroxyl groups per molecule and (b) a hydroxyalkylated substantially petroleum hydrocarbon-insoluble pine wood resin in which the hydroxyalkyl group is selected from the group consisting of hydroxyethyl and hydroxypropyl, said blend having a hydroxyl number in the range of 40–650, (2) an organic polyisocyanate in amount such that about 0.7 to 1.1 isocyanato groups are available per reactive hydrogen in said mixture, and (3) a blowing agent.

2. The method of claim 1 in which the polyisocyanate is an organic diisocyanate.

3. The method of claim 1 in which the hydroxyalkylated substantially petroleum hydrocarbon-insoluble pine wood resin is a reaction product of ethylene oxide and substantially petroleum hydrocarbon-insoluble pine wood resin, the amount of ethylene oxide reacted being at least chemically equivalent to the carboxylic acid groups of the substantially petroleum hydrocarbon-insoluble pine wood resin.

4. The method of claim 1 in which the hydroxyalkylated substantially petroleum hydrocarbon-insoluble pine wood resin is a reaction product of propylene oxide and 6. A polyurethane foam prepared by reaction of an organic polyisocyanate with a mixture of (a) a polyol of the group consisting of polyesters and polyethers having at least two hydroxyl groups per molecule and (b) a hydroxyethylated substantially petroleum hydrocarbon-insoluble pine wood resin in the presence of a foaming agent.

7. A polyurethane foam prepared by reaction of an organic polyisocyanate with a mixture of (a) a polyol of the group consisting of polyesters and polyethers having at least two hydroxyl groups per molecule and (b) a hydroxypropylated substantially petroleum hydrocarbon-insoluble pine wood resin in the presence of a foaming agent.

References Cited

UNITED STATES PATENTS 2,138,193   11/1938   Peterson _____ 260—104
2,555,901   6/1951   Rummelsburg _____ 260—104

FOREIGN PATENTS 1,044,323   11/1958   Germany.
616,352   10/1962   Belgium.
876,469   9/1961   Great Britain.

DONALD E. CZAJA, *Primary Examiner.*

LEON J. BERCOVITZ, *Examiner.*

J. J. KLOCKO, G. W. RAUCHFUSS, Jr.,
*Assistant Examiners.*